US008905016B2

(12) United States Patent
Sakai et al.

(10) Patent No.: US 8,905,016 B2
(45) Date of Patent: Dec. 9, 2014

(54) HELIOSTAT FOR COLLECTING SUNLIGHT AND METHOD OF CONTROLLING THE SAME

(75) Inventors: Shoji Sakai, Ube (JP); Shiro Hayasaka, Tamano (JP); Katsuyoshi Abe, Tamano (JP); Kozo Ito, Tamano (JP)

(73) Assignee: Mitsui Engineering & Shipbuilding Co., Ltd., Tokyo (JP)

( * ) Notice: Subject to any disclaimer, the term of this patent is extended or adjusted under 35 U.S.C. 154(b) by 0 days.

(21) Appl. No.: 13/496,143

(22) PCT Filed: Nov. 19, 2010

(86) PCT No.: PCT/JP2010/070746
§ 371 (c)(1),
(2), (4) Date: Mar. 14, 2012

(87) PCT Pub. No.: WO2012/053120
PCT Pub. Date: Apr. 26, 2012

(65) Prior Publication Data
US 2012/0279486 A1    Nov. 8, 2012

(30) Foreign Application Priority Data
Oct. 22, 2010    (JP) .................................. 2010-237629

(51) Int. Cl.
*F24J 2/16*        (2006.01)
*F24J 2/54*        (2006.01)

(52) U.S. Cl.
CPC    *F24J 2/5431* (2013.01); *F24J 2/16* (2013.01); *Y02B 10/20* (2013.01); *Y02E 10/47* (2013.01); *Y02E 10/46* (2013.01); *F24J 2002/5489* (2013.01)
USPC ........... 126/600; 126/608; 126/592; 126/629; 136/246

(58) Field of Classification Search
USPC .................. 126/600, 608, 592, 629; 136/246; 359/872
See application file for complete search history.

(56) References Cited

U.S. PATENT DOCUMENTS

| 4,360,182 | A | * | 11/1982 | Titus | 248/371 |
| 4,930,493 | A | * | 6/1990 | Sallis | 126/600 |
| 6,960,717 | B2 | * | 11/2005 | Stuart et al. | 136/246 |
| 7,987,844 | B2 | * | 8/2011 | Zillmer et al. | 126/611 |
| 2009/0050191 | A1 | | 2/2009 | Young et al. | |
| 2010/0243031 | A1 | | 9/2010 | Ezawa et al. | |
| 2010/0276570 | A1 | * | 11/2010 | Moser | 250/203.4 |
| 2011/0146663 | A1 | | 6/2011 | Ezawa et al. | |

FOREIGN PATENT DOCUMENTS

| JP | 2009109136 | 5/2009 |
| JP | 2010101594 | 5/2010 |

* cited by examiner

*Primary Examiner* — Avinash Savani
(74) *Attorney, Agent, or Firm* — Westerman, Hattori, Daniels & Adrian, LLP

(57) ABSTRACT

A heliostat capable of collecting light with high efficiency and having reduced manufacturing and installation costs; and a method of controlling the heliostat. The heliostat includes a reflecting mirror configured to reflect sunlight; and a support mechanism configured to tiltably support the reflecting mirror. The support mechanism has a single supporting column and first and second cylinders. The reflecting mirror is supported at its back surface by a supporting column upper end of the supporting column, a first cylinder upper end of the first cylinder and a second cylinder upper end of the second cylinder in a tiltable manner, which are arranged to form a triangle on the back surface of the reflecting mirror. A gimbal bearing connects the supporting column upper end and the reflecting mirror, the gimbal bearing being configured to be tiltable in two axial directions intersecting with each other.

12 Claims, 3 Drawing Sheets

HELIOSTAT FOR COLLECTING SUNLIGHT AND METHOD OF CONTROLLING THE SAME

CROSS-REFERENCE TO RELATED APPLICATIONS

The present patent application is a nationalization of International application No. PCT/2010/070746, filed Nov. 19, 2010, published in Japanese, which is based on, and claims priority from, Japanese Application No. 2010-237629, filed Oct. 22, 2010, both of which are incorporated herein by reference in their entireties.

BACKGROUND OF THE INVENTION

1. Field of the Invention

The present invention relates to a heliostat for collecting sunlight, configured to track the sun and thus to collect reflected light at a desired point (focal point) and also relates to a method of controlling the same. In addition, the present invention relates to a solar thermal power plant configured by using a plurality of the heliostats.

2. Description of Related Art Including Information Disclosed Under 37 CFR §§1.97 and 1.98

In recent years, depletion of petroleum resources and escalation in their prices have been of concern, and a study on shifting to new energy resources from the petroleum resources, which are a cause of global warming, has been conducted. As a new energy source, there is solar thermal power generation, which collects sunlight and uses the sunlight as energy.

FIG. 5 shows an example of a solar thermal power generation apparatus. The solar thermal power generation apparatus includes a heliostat 1X configured to reflect sunlight L from the sun 10 and a heat receiving unit 13 installed at a focal point F of the heliostat 1X. The heliostat 1X includes reflecting mirrors 2X and a support mechanism 3X. This solar thermal power generation apparatus heats a heat medium circulating in the heat receiving unit 13 with the sunlight L collected at the focal point F and generates water vapor or the like by use of the heat of this heat medium, thereby generating power.

The applicant has filed a patent application for a heliostat and a method of controlling the same which generate no comatic aberration for the purpose of improving the power generation efficiency of this solar thermal power generation apparatus (refer to Patent Document 1). This heliostat 1Y includes reflecting mirrors 2Y and a support mechanism 3Y. In addition, this heliostat 1Y includes tilting devices 11. The tilting devices 11 are each configured in such a way that tilt of the tilting device 11 is controlled with rotation angles as the parameters by using link mechanisms 12 in two axial directions. Since this heliostat 1Y tracks the sun 10 by tilting in the two axial directions, it is possible to obtain high light collection efficiency without generating any comatic aberration.

Meanwhile, there is an apparatus configured in such a way that a sun-tracking sensor is installed in each heliostat for the purpose of improving the power generation efficiency (refer to Patent Document 2). With this configuration, the heliostats can form the focal point F on the heat receiving unit 13 with high accuracy.

The heliostat described above has some problems in an aim to further spread solar thermal power generation apparatuses. First, there is a problem that it is difficult to further reduce its manufacturing cost and its installation cost. This is because the number of components of each of the tilting device 11 and the link mechanism 12 is large in particular. For this reason, there is a limitation in reducing the manufacturing cost. In addition, its assembly work requires some time.

Second, there is a problem that improvement in the accuracy in tracking of the sun by the heliostat requires costs. This is because, in consideration of controlling the tilt of the reflecting mirror within an accuracy of ±0.1 degree, an expensive motor is required for tilting the reflecting mirror. In particular, in a case where a reducer is installed in the motor for the purpose of simplifying the control of the heliostat, a minute looseness of a gear causes backlash. The occurrence of such backlash makes it difficult to achieve the aforementioned accuracy within ±0.1 degree with low costs.

PRIOR ART DOCUMENTS

Patent Documents

[Patent Document 1] Japanese Patent No. 4473332
[Patent Document 2] Japanese Patent No. 4541395

BRIEF SUMMARY OF THE INVENTION

Problem to be Solved by the Invention

The present invention has been made in view of the problems described above and aims to provide a heliostat which is capable of collecting light with high efficiency and whose manufacturing cost and installation cost are reduced and also to provide a method of controlling the heliostat. In addition, an object of the invention is to provide a heliostat whose control accuracy is further improved while its costs are reduced and also to provide a method of controlling the heliostat. Furthermore, an object of the invention is to provide a heliostat whose maintenance cost is reduced by reducing the number of components forming the heliostat.

DETAILED DESCRIPTION OF THE INVENTION

Figure 1:
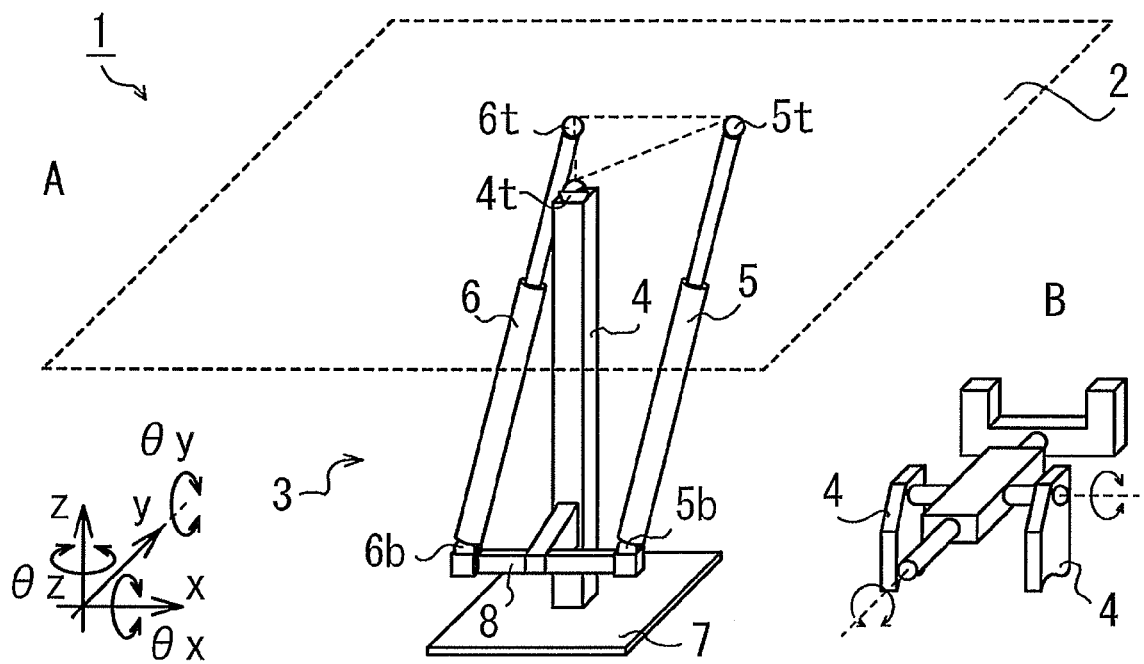
FIG. 1 is a schematic view showing a heliostat of an embodiment according to the present invention.

A heliostat according to the invention for achieving the object includes: a reflecting mirror configured to reflect sunlight; and a support mechanism configured to support the reflecting mirror in a tiltable manner. The heliostat is characterized in that: the support mechanism has a single supporting column and a first cylinder and a second cylinder; the reflecting mirror is supported at a back surface thereof by a supporting column upper end of the supporting column, a first cylinder upper end of the first cylinder and a second cylinder upper end of the second cylinder in a tiltable manner; the supporting column upper end, the first cylinder upper end and the second cylinder upper end are arranged in such a manner as to form a triangle on the back surface of the reflecting mirror; and a gimbal bearing is used to connect the supporting column upper end and the reflecting mirror, the gimbal bearing being configured to be tiltable in two axial directions intersecting with each other With this configuration, the manufacturing cost and the installation cost of the heliostat can be reduced. This is because the number of components of the support mechanism can be reduced. In addition, since the tilt of the reflecting mirror can be determined by using the lengths of the two cylinders as the parameters, it is possible to improve the accuracy in tracking of the sun by the heliostat with low costs.

The heliostat is characterized in that the triangle is an isosceles triangle having its apex at the supporting column upper end. With this configuration, the calculation for determining the tilt of the reflecting mirror by using the lengths of the two cylinders is made easier.

The heliostat is characterized in that the first cylinder and the second cylinder are each a screw jack cylinder. With this configuration, it is made possible to control, with high accuracy, the lengths of the two cylinders, which are used as the parameters for determining the tilt of the reflecting mirror, and thus to improve the light collection efficiency of sunlight. Note that, the screw jack cylinder is a cylinder having a configuration in which rotary movement is converted into linear movement, and thereby, expansion and contraction of the cylinder is controlled. The screw jack cylinders include an electric cylinder of a ball screw type or others such as an electric cylinder of a roller screw type and the like, for example.

A solar thermal power plant for achieving the object is characterized in that a plurality of the heliostats are arranged, and solar thermal power generation is performed by collecting sunlight at a heat receiving unit using molten salt as a heat medium. With this configuration, it is possible to considerably reduce the construction cost of the solar thermal power plant.

A method of controlling a heliostat according to the invention for achieving the object is a method of controlling a heliostat including: a reflecting mirror configured to reflect sunlight; and a support mechanism configured to support the reflecting mirror in a tiltable manner, in which: the support mechanism has a single supporting column and a first cylinder and a second cylinder; the reflecting mirror is supported at a back surface thereof by a supporting column upper end of the supporting column, a first cylinder upper end of the first cylinder and a second cylinder upper end of the second cylinder in a tiltable manner; the supporting column upper end, the first cylinder upper end and the second cylinder upper end are arranged in such a manner as to form a triangle on the back surface of the reflecting mirror; and a gimbal bearing is used to connect the supporting column upper end and the reflecting mirror, the gimbal bearing being configured to be tiltable in two axial directions intersecting with each other. The method is characterized by comprising: performing first tilt control in which the reflecting mirror is tilted within a first plane by expanding or contracting the two cylinders by the same length; and performing second tilt control in which the reflecting mirror is tilted within a second plane by expanding or contracting the two cylinders by different lengths, in tracking of the sun.

With this configuration, the same operational effects as those described above can be obtained. In addition, since the tilt of the reflecting mirror can be determined by using the absolute and relative lengths of the two cylinders, it is possible to improve the accuracy in tracking of the sun by the heliostat with low costs.

Effects of the Invention

With the heliostat and the method of controlling the same according to the present invention, it is possible to provide a heliostat which includes a reflecting mirror configured to reflect sunlight and a support mechanism configured to support the reflecting mirror, which is capable of collecting light with high efficiency and whose manufacturing cost and installation cost are reduced, and also to provide a method of controlling the heliostat.

MODE FOR CARRYING OUT THE INVENTION

Hereinafter, a description will be given of a heliostat according to an embodiment of the present invention with reference to the drawings. FIG. 1A shows a heliostat 1 of the embodiment according to the present invention. The heliostat 1 includes a reflecting mirror 2 and a support mechanism 3 configured to support the reflecting mirror 2 from the back surface of the reflecting mirror 2 in a tiltable manner. The support mechanism 3 has: a supporting column 4, which is vertically installed on a bottom plate 7; an arm unit 8, which is fixed to the supporting column 4; and a first cylinder 5 and a second cylinder 6. The supporting column 4 supports the reflecting mirror 2 in a tiltable manner via a gimbal bearing installed on a supporting column upper end 4t. In addition, the first cylinder 5 has spherical bearings on a first cylinder upper end 5t and a first cylinder lower end 5b, respectively, and the first cylinder lower end 5b is connected to the arm unit 8 at a lower portion of the supporting column 4, and the first cylinder upper end 5t is connected to the reflecting mirror 2. The second cylinder 6 is configured in the same manner as the first cylinder 5. The two cylinders 5 and 6 are configured to be in parallel with each other when their lengths are the same.

In addition, FIG. 1B shows an example of the gimbal bearing installed on the supporting column upper end 4t. The gimbal bearing is configured to be tiltable in two axial directions intersecting with each other. These two axes are preferably configured to be orthogonal to each other.

Here, the positions of the supporting column upper end 4t and the first cylinder upper end 5t and a second cylinder upper end 6t are determined so that these ends cannot be arranged linearly (so that these ends can form a triangle). The connected positions of the cylinder upper ends 5t and 6t are preferably determined in such a manner as to form an isosceles triangle having its apex at the supporting column upper end 4t. The three points including the supporting column upper end 4t and the two cylinder upper ends 5t and 6t can determine a single plane. To put it specifically, the tilt angle of the reflecting mirror 2 can be determined by determining the positions of the three points.

Note that, the spherical bearings respectively installed on the cylinder upper ends 5t and 6t as well as lower ends 5b and 6b are not limited to the configuration described above. Universal joints or the like may be used, for example. To put it more specifically, any structure not preventing the reflecting mirror 2 from tilting in two axial directions orthogonal to each other may be used. Meanwhile, a spherical bearing cannot be used for the gimbal bearing installed on the supporting column upper end 4t. This is because mirror rotation occurs if a spherical bearing is used for the supporting column upper end 4t. The mirror rotation refers to a case where the reflecting mirror 2 rotates in a θz direction shown in FIG. 1, and the mirror rotation causes reduction in sunlight collection efficiency. To put it more specifically, if spherical bearings are used for all of the supporting column upper end 4t, the first cylinder upper end 5t, the second cylinder upper end 6t, the first cylinder lower end 5b and the second cylinder lower end 6b, it is difficult for the reflecting mirror 2 to maintain a single surface (the surface of the reflecting mirror 2 rotates so as to be twisted entirely) regardless of the lengths of the cylinders 5 and 6.

Meanwhile, each of the cylinders 5 and 6 just needs to have an expansion and contraction mechanism. A hydraulic cylinder, an air cylinder or the like can be used, for example. A screw jack cylinder is preferably used. The screw jack cylinder has a configuration in which the rotational force of a motor or the like is transmitted to a cylinder shaft having a thread groove formed on its surface, and this cylinder shaft expands and contracts in the longitudinal direction of the shaft. It is possible to improve the accuracy of the length of expansion and contraction of the cylinder with this screw jack.

Furthermore, the supporting column 4 may support any location on the back surface of the reflecting mirror 2. The supporting column 4 preferably supports the center of the reflecting mirror 2. Here, the reflecting mirror 2 is formed in a large size, which is approximately 2×3 m. The reflecting mirror 2 may be formed in a small size, which is 0.3 square meters. However, since the number of support mechanisms 3 can be reduced with a large reflecting mirror, the cost-reduction effect is high when a large reflecting mirror is employed.

Figure 2:
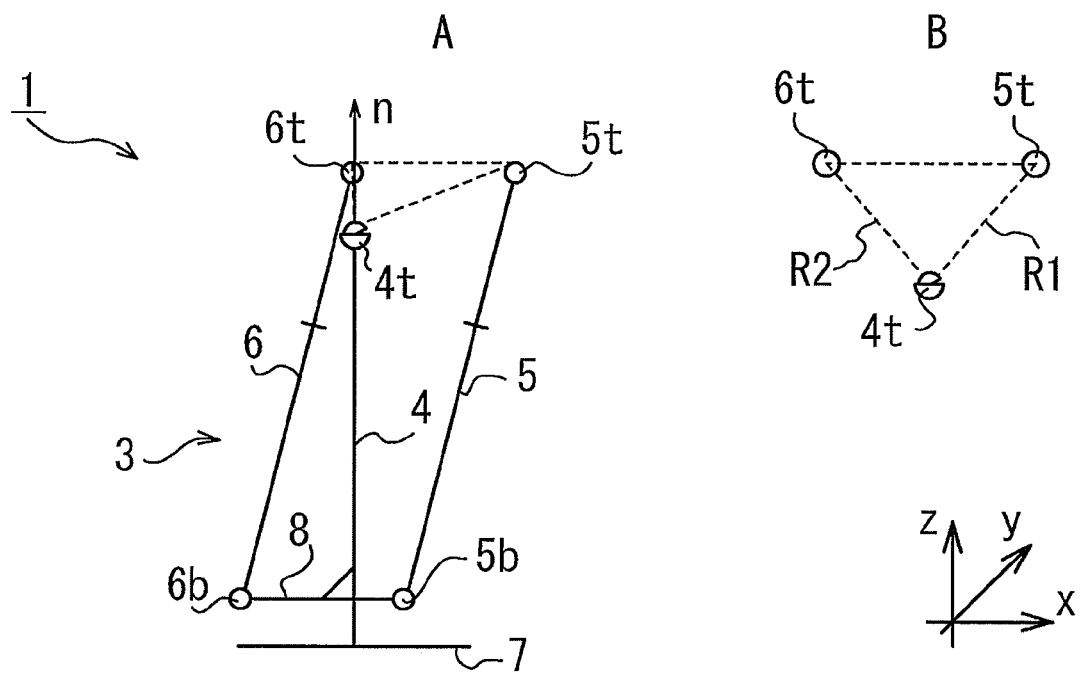
FIG. 2 is a diagram showing a mechanistic model of the heliostat of the embodiment according to the present invention.

FIG. 2 shows a diagram obtained by simulating the mechanism of the heliostat 1 shown in FIG. 1. FIG. 2B shows a triangle formed by the supporting column upper end 4t, the first cylinder upper end 5t and the second cylinder upper end 6t. Here, an oblique side connecting the supporting column upper end 4t and the first cylinder upper end 5t is shown as a first oblique side R1, and an oblique side connecting the supporting column upper end 4t and the second cylinder upper end 6t is shown as a second oblique side R2. In this heliostat 1, when the positions of the first oblique side R1 and the second oblique side R2 are determined, the tilt of the reflecting mirror 2 can be uniquely determined.

To put it more specifically, the position of the first cylinder upper end 5t is determined by using the length of the first cylinder 5 as a parameter with respect to the supporting column upper end 4t, which is a fixed point. Thus, the position (coordinates) of the first oblique side R1 in a three-dimensional space is determined. Hereinafter, the control of this first cylinder 5 is termed as "first control." Likewise, the position of the second cylinder upper end 6t is determined by using the length of the second cylinder 6 as a parameter with respect to the supporting column upper end 4t. Thus, the position (coordinates) of the second oblique side R2 in the three-dimensional space is determined. Hereinafter, the control of this second cylinder 6 is termed as "second control." The determination (the first control and the second control) of the positions of the first oblique side R1 and the second oblique side R2 determines the coordinates of the triangle, thus determining the tilt of the reflecting mirror 2 of the heliostat 1. Note that, the triangle described above is preferably an isosceles triangle (R1=R2).

Figure 3:
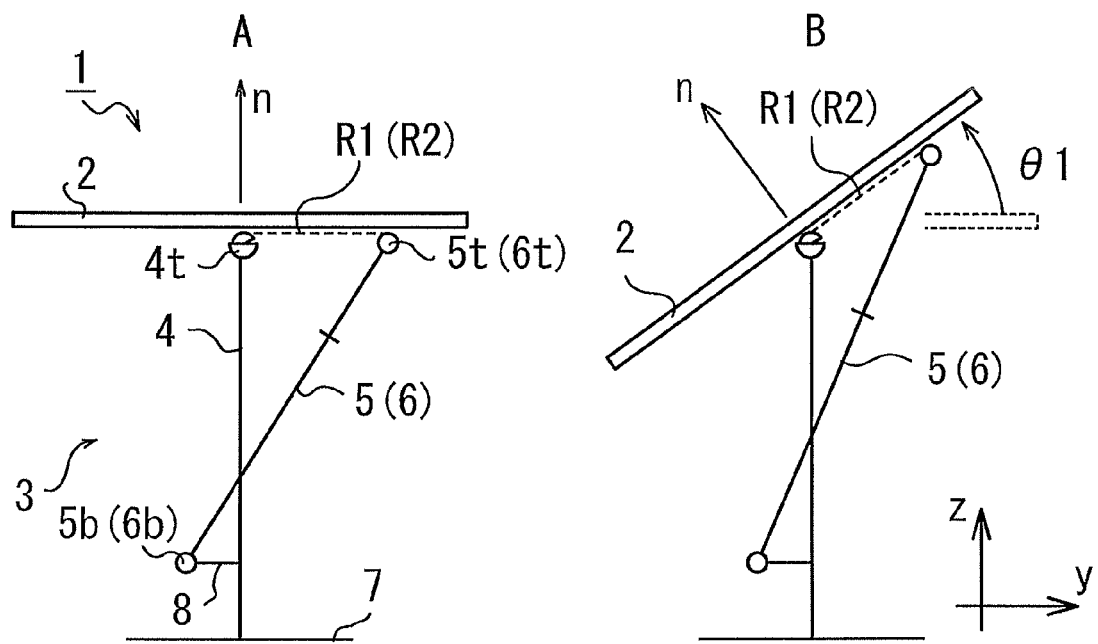
FIG. 3 is a diagram showing a mechanistic model of the heliostat of the embodiment according to the present invention.

Next, a description will be given of elements of the operation of the heliostat 1. FIG. 3 shows a side surface (Y-Z plane) of the mechanistic model of the heliostat 1. FIG. 3A shows a state where the reflecting mirror 2 of the heliostat 1 is horizontal. FIG. 3B shows a state where the reflecting mirror 2 is tilted around the supporting column upper end 4t by an angle $\theta1$. This tilting is performed within a first plane (Y-Z plane).

The tilt of the reflecting mirror 2 in the first plane is performed by inputting a value obtained by adding an expansion and contraction amount of an identical value to the parameter (absolute length of the cylinder) in each of the first control and the second control. To put it more specifically, the first cylinder 5 and the second cylinder 6 are controlled so as to expand by the same length. FIG. 3 shows a case where the initial lengths of the first cylinder 5 and the second cylinder 6 are identical to each other. However, even in a case where the initial lengths of the two cylinders 5 and 6 are different, if an expansion and contraction amount of an identical value is added, the reflecting mirror 2 is tilted within the first plane. Note that, the tilt angle $\theta1$ is configured to have a range of ±90 degrees with the state shown in FIG. 3A, as a reference. The tilt angle $\theta1$ is preferably configured to have a range of +75 degrees to −30 degrees.

Here, the heliostat 1 is arranged in such a way that the cylinders 5 and 6 intersect with the supporting column 4 in a side view. With this configuration, the center of gravity of the heliostat 1 is positioned near the center of the reflecting mirror and thus the heliostat 1 becomes stable. Note that, the heliostat 1 may be configured in such a way that the cylinders 5 and 6 do not intersect with the supporting column 4 in a side view. In addition, the heliostat 1 may be configured in such a way that the lower end portions of the cylinders 5 and 6 are directly installed on the bottom plate 7 without using the arm unit 8.

Figure 4:
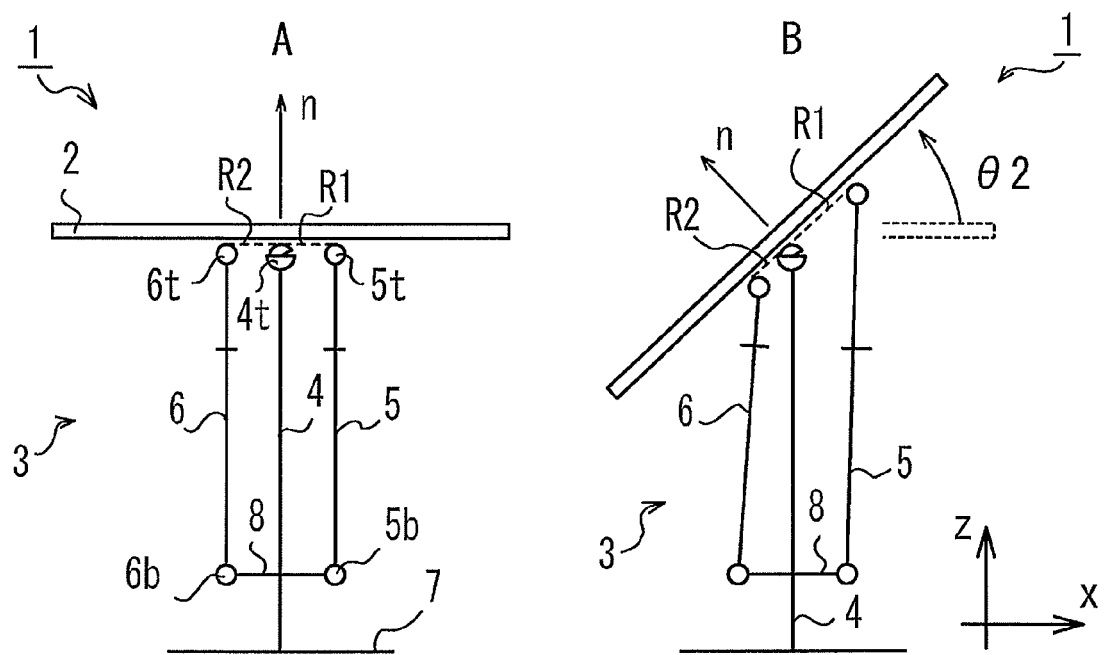
FIG. 4 is a diagram showing a mechanistic model of the heliostat of the embodiment according to the present invention.
Figure 5:
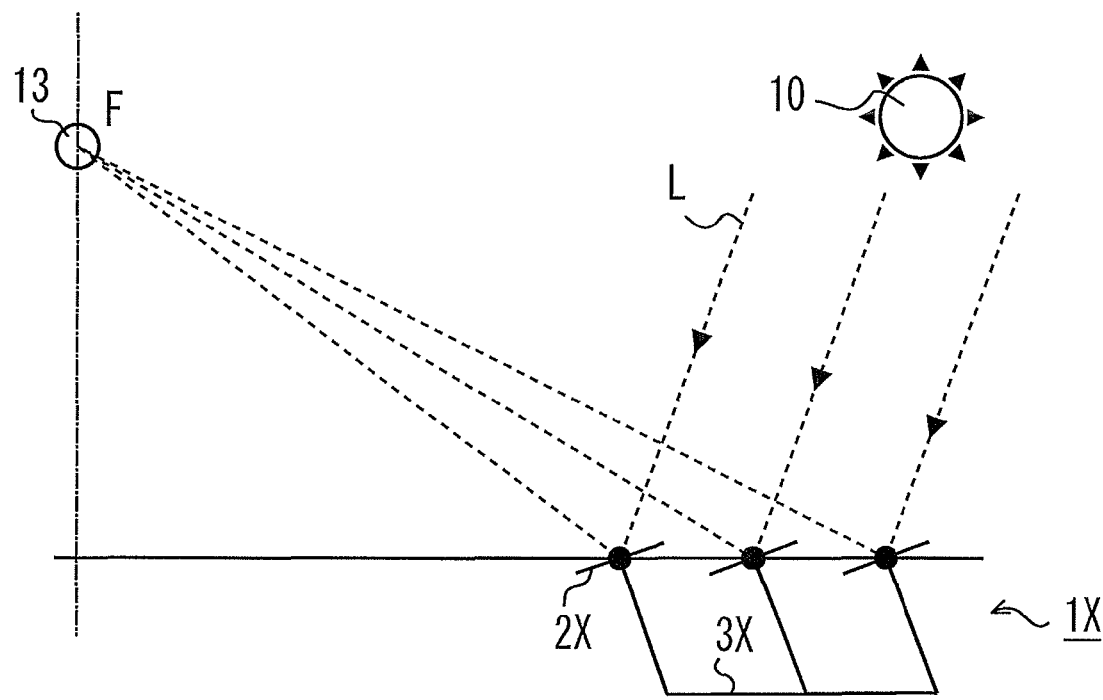
FIG. 5 is a diagram schematically showing a conventional solar thermal power generation apparatus.
Figure 6:
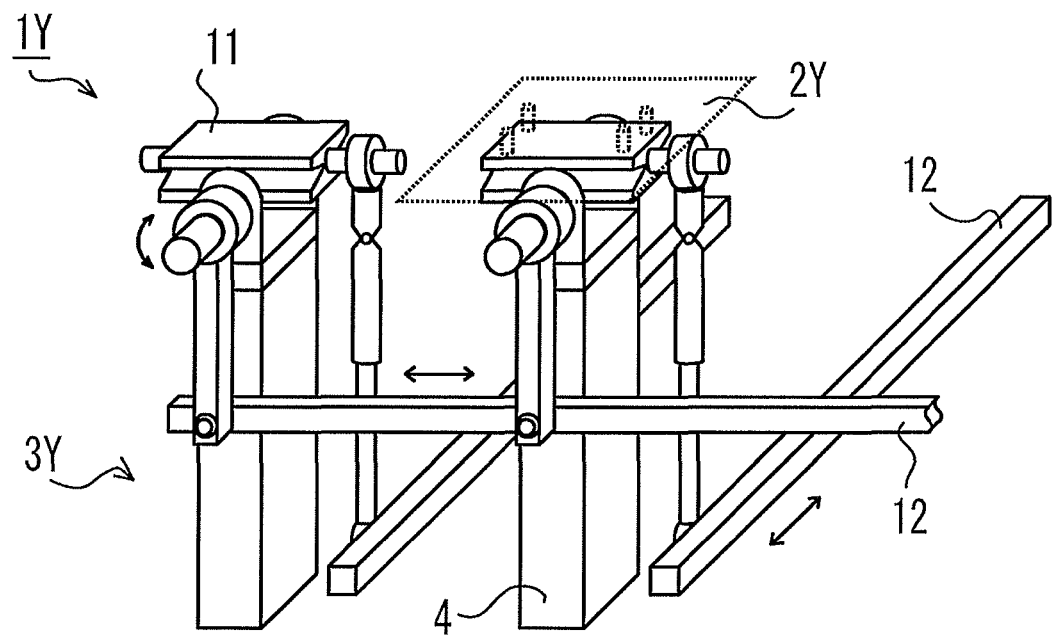
FIG. 6 is a schematic view showing a conventional heliostat.

FIG. 4 shows a front view (X-Z plane) of the mechanistic model of the heliostat 1. FIG. 4A shows a state where the reflecting mirror 2 of the heliostat 1 is horizontal. FIG. 4B shows a state where the reflecting mirror 2 is tilted around the supporting column upper end 4t by an angle $\theta2$. This tilting is performed within a second plane (Y-Z plane). Note that, the length between the two cylinder upper ends 5t and 6t and the length between the two cylinder lower ends 5b and 6b may be different.

The tilt of the reflecting mirror 2 in the second plane is performed by inputting a parameter in such a way that the difference between the absolute lengths of the cylinders 5 and 6 changes in each of the first control and the second control. To put it more specifically, the cylinders 5 and 6 are controlled in such a way that the difference between the absolute lengths of the first cylinder 5 and the second cylinder 6 changes. The difference between the lengths of the cylinders 5 and 6 determines the tilt angle $\theta2$. Note that, the tilt angle $\theta2$ is configured to have a range of ±90 degrees with the state shown in FIG. 4A, as a reference. The tilt angle $\theta2$ is preferably configured to have a range of ±75 degrees. The tilt angle $\theta2$ is more preferably configured to have a range of ±50 degrees.

Here, it can be stated that the capability in tracking the sun is high when the ranges of the tilt angle $\theta1$ and the tilt angle $\theta2$ are large. However, in order to reduce the manufacturing cost of the heliostat 1, the heliostat 1 is preferably configured in such a way that the ranges of the tilt angles $\theta1$ and $\theta2$ are set slightly smaller. To put it more specifically, if collection of sunlight immediately after sunrise and immediately before sunset, which has a low energy value, is not performed, it is possible to further reduce the manufacturing cost of the heliostat 1.

Next, a description will be given of tracking of the sun by the heliostat 1. The position of the sun as a tracking target becomes apparent from the coordinates (latitude, longitude) and almanac (tilt of the axis of the earth) of the region where the heliostat 1 is installed. The heliostat 1 is controlled on the basis of the position information of the sun. To put it more specifically, this control uses no sun-tracking sensor. A normal line n to be taken by the reflecting mirror 2 is calculated from the position of the sun and the position of the focal point F. A triangle having this normal line n is calculated, and the positions of the oblique sides R1 and R2 in a three-dimensional space are calculated. The absolute lengths of the first cylinder 5 and the second cylinder 6 are calculated from the positions of the oblique sides R1 and R2. The first cylinder 5 and the second cylinder 6 are expanded or contracted on the basis of the aforementioned calculations, thereby tilting the reflecting mirror 2 (the first control and the second control). At this time, the first control and the second control may be performed simultaneously or may be performed in sequence. Note that, the installation direction of the heliostat 1 is preferably set in such a way that the supporting column upper end 4*t* (the apex 4*t* of the triangle) is in a direction toward the focal point F.

With the configuration described above, the following operational effects can be obtained. First, the manufacturing cost and the installation cost of the heliostat can be reduced. The support mechanism just needs a supporting column and two cylinders at least. Thus, the number of components is reduced, and the manufacturing cost can be thus reduced. In addition, with the reduction in the number of components, assembly of the heliostat is made easier, and the installation cost can be thus reduced. Furthermore, the reduction in the number of components reduces the possibility of failure occurrence and also reduces the number of places need to be checked. Thus, it is made possible to reduce the maintenance cost.

Second, it is made easier to track the sun when the reflecting mirror of the heliostat is around a horizontal position. In addition, it is possible to improve the accuracy in tracking of the sun by the heliostat with low costs. This is because the tilt of the reflecting mirror can be determined by using the lengths of the two cylinders as the parameters. The configuration to perform control by using the lengths of the two cylinders as the parameters can prevent the phenomenon that the speed of tracking the sun by the reflecting mirror increases around a horizontal position and can also improve the accuracy in tracking of the sun while the costs are reduced, as compared with the conventional control using a rotation angle (turn angle of the reflecting mirror) as the parameter. In addition, with the configuration with which the tilt of the reflecting mirror can be determined by the lengths of the two cylinders, it is made possible to use fixed wiring for wiring to the tilting device and also to reduce the length of the wiring. Thus, the costs for the wiring cables and wiring operation can be reduced.

Third, the construction cost of the solar thermal power plant can be considerably reduced. This is because the improvement in the accuracy in tracking of the sun by the heliostat eliminates the need for the sun-tracking sensor. The configuration without installation of a sun-tracking sensor makes it possible to obtain a considerable cost reduction effect particularly in a large-scale solar thermal power plant using hundreds of or thousands of heliostats. Here, even if the heliostat is configured to use a sun-tracking sensor, the cost reduction effect of the main body of the heliostat can be obtained.

EXPLANATION OF REFERENCE NUMERALS

1 heliostat
2 reflecting mirror
3 support mechanism
4 supporting column
4*t* supporting column upper end
5 first cylinder
5*t* first cylinder upper end
6 second cylinder
6*t* second cylinder upper end
7 bottom plate
8 arm unit
R1 first oblique side
R2 second oblique side

The invention claimed is:
1. A heliostat comprising:
a reflecting mirror configured to reflect sunlight, the reflecting mirror having a center and a back surface;
a support mechanism configured to support the reflecting mirror in a tiltable manner, the support mechanism having;
a single supporting column having an upper end and a lower portion, the upper end of the supporting column being a fixed point;
a first cylinder having an upper end and a lower end, and a second cylinder having an upper end and a lower end, the first cylinder and the second cylinder being expandable and contractable so that the first cylinder and the second cylinder have lengths that are adjustable and the upper ends of the first cylinder and the second cylinder are movable points, the upper end of the first cylinder and the upper end of the second cylinder including connectors connected to the back surface of the reflecting mirror; and
a gimbal bearing connecting the supporting column upper end to a connecting position on the back surface of the reflecting mirror, the gimbal bearing being tiltable in two axial directions intersecting with each other and configured to prevent the reflecting mirror from rotating around the supporting column as a central axis;
wherein:
the reflecting mirror is supported at the back surface thereof by the upper end of the supporting column, the upper end of the first cylinder and the upper end of the second cylinder in a tiltable manner;
the connecting position of the upper end of the supporting column, the upper end of the first cylinder and the upper end of the second cylinder are arranged to form a triangle on the back surface of the reflecting mirror; and
the first cylinder and the second cylinder are arranged to be parallel when the length of the first cylinder and the length of the second cylinder are the same;
the first cylinder, the second cylinder, and the supporting column are arranged so that the first cylinder and the second cylinder appear to be parallel to the supporting column in a front view when the length of the first cylinder and the length of the second cylinder are the same;
the first cylinder, the second cylinder, and the supporting column are arranged so that a plane defined by a midpoint between the upper ends of the first cylinder and the second cylinder, the lower end of the first cylinder, and the lower end of the second cylinder, intersects with the supporting column so that the first cylinder and the second cylinder appear to intersect with the supporting column in a side view, whereby the center of gravity of the heliostat is positioned near the center of the reflecting mirror.
2. The heliostat according to claim 1 wherein the triangle is an isosceles triangle having its apex at the supporting column upper end.

3. The heliostat according to claim 1 wherein the first cylinder and the second cylinder are each a screw jack cylinder.

4. A solar thermal power plant comprising:
   an arrangement of a plurality of the heliostats according to claim 1, and
   a heat receiving unit using molten salt as a heat medium for collecting sunlight in order to perform solar thermal power generation.

5. The heliostat according to claim 1 wherein the reflecting mirror has a tilt angle in the range of ±90 degrees.

6. A method of controlling the heliostat of claim 1, wherein the triangle on the back surface of the reflecting mirror has a first oblique side connecting the connecting position of the upper end of the supporting column and the upper end of the first cylinder, and a second oblique side connecting the connecting position of the upper end of the supporting column and the upper end of the second cylinder, the method comprising:
   expanding or contracting the first cylinder to move the upper end of the first cylinder while the upper end of the supporting column remains fixed and the plane defined by the midpoint between the upper ends of the first cylinder and the second cylinder, the lower end of the first cylinder, and the lower end of the second cylinder, intersects with the supporting column;
   following the step of expanding or contracting the first cylinder, using the length of the first cylinder to determine the position of the upper end of the first cylinder;
   expanding or contracting the second cylinder to move the upper end of the second cylinder while the upper end of the supporting column remains fixed and the plane defined by the midpoint between the upper ends of the first cylinder and the second cylinder, the lower end of the first cylinder, and the lower end of the second cylinder, intersects with the supporting column;
   following the step of expanding or contracting the second cylinder, using the length of the second cylinder to determine the position of the upper end of the second cylinder;
   determining a position of the first oblique side of the triangle using the position of the upper end of the first cylinder and the upper end of the supporting column;
   determining a position of the second oblique side of the triangle using the position of the upper end of the second cylinder and the upper end of the supporting column;
   determining the coordinates of the triangle using the position of the first and second oblique sides of the triangle; and
   determining a tilt angle of the reflecting mirror based on the coordinates of the triangle.

7. The heliostat according to claim 1 wherein the reflecting mirror has a tilt angle determined by a parameter with the absolute lengths of the first cylinder and the second cylinder, and by a parameter with the difference between the absolute lengths of the first cylinder and the second cylinder.

8. A method of controlling the heliostat of claim 7, comprising:
   tilting the reflecting mirror in a first plane by expanding or contracting the first cylinder and the second cylinder by the same length while the upper end of the support column remains fixed and the plane defined by the midpoint between the upper ends of the first cylinder and the second cylinder, the lower end of the first cylinder, and the lower end of the second cylinder, intersects with the supporting column;
   tilting the reflecting mirror in a second plane by expanding or contracting the first cylinder and the second cylinder by different lengths while the upper end of the support column remains fixed and the plane defined by the midpoint between the upper ends of the first cylinder and the second cylinder, the lower end of the first cylinder, and the lower end of the second cylinder, intersects with the supporting column; and
   determining the tilt angle of the reflecting mirror based on the absolute lengths of the first cylinder and the second cylinder, and on the difference between the absolute lengths of the first cylinder and the second cylinder.

9. The heliostat according to claim 1, wherein the supporting column supports the center of the reflecting mirror.

10. The heliostat according to claim 1, wherein the lower end of the first cylinder is connected to a first point, the lower end of the second cylinder is connected to a second point, and the first and second points lie in a horizontal plane intersecting the supporting column at the lower portion thereof.

11. The heliostat according to claim 10, wherein the lower end of the first cylinder is connected to the first point, the lower end of the second cylinder is connected to the second point, the upper end of the first cylinder is connected to the back surface of the reflecting mirror, and the upper end of the second cylinder is connected to the back surface of the reflecting mirror, all in a movable manner to allow the reflecting mirror to tilt in two axial directions orthogonal to each other.

12. The heliostat according to claim 10, wherein the support mechanism further includes an arm unit fixed to the lower portion of the supporting column, and wherein the first and second points are on the arm unit.

* * * * *